United States Patent Office 3,441,837
Patented Apr. 29, 1969

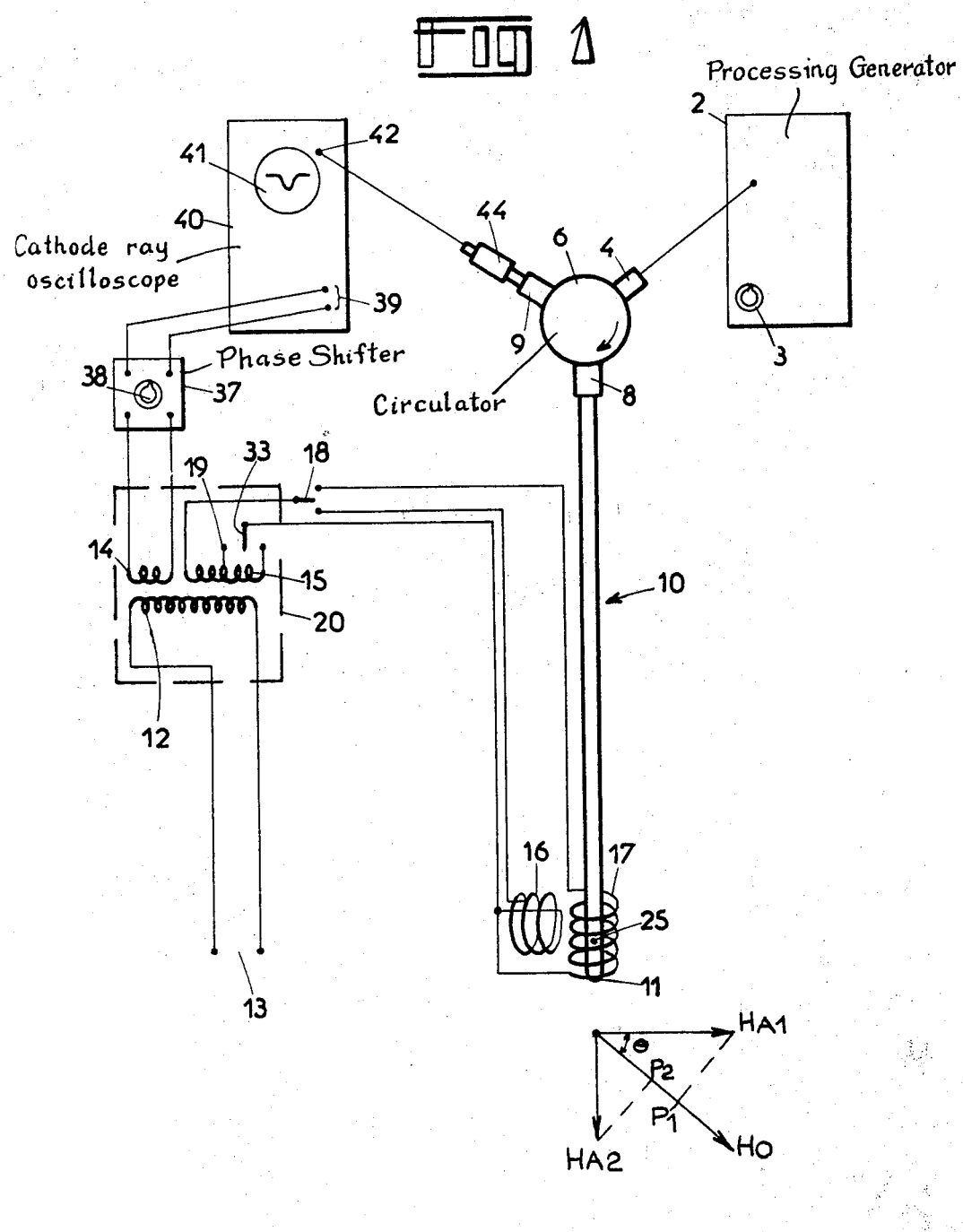

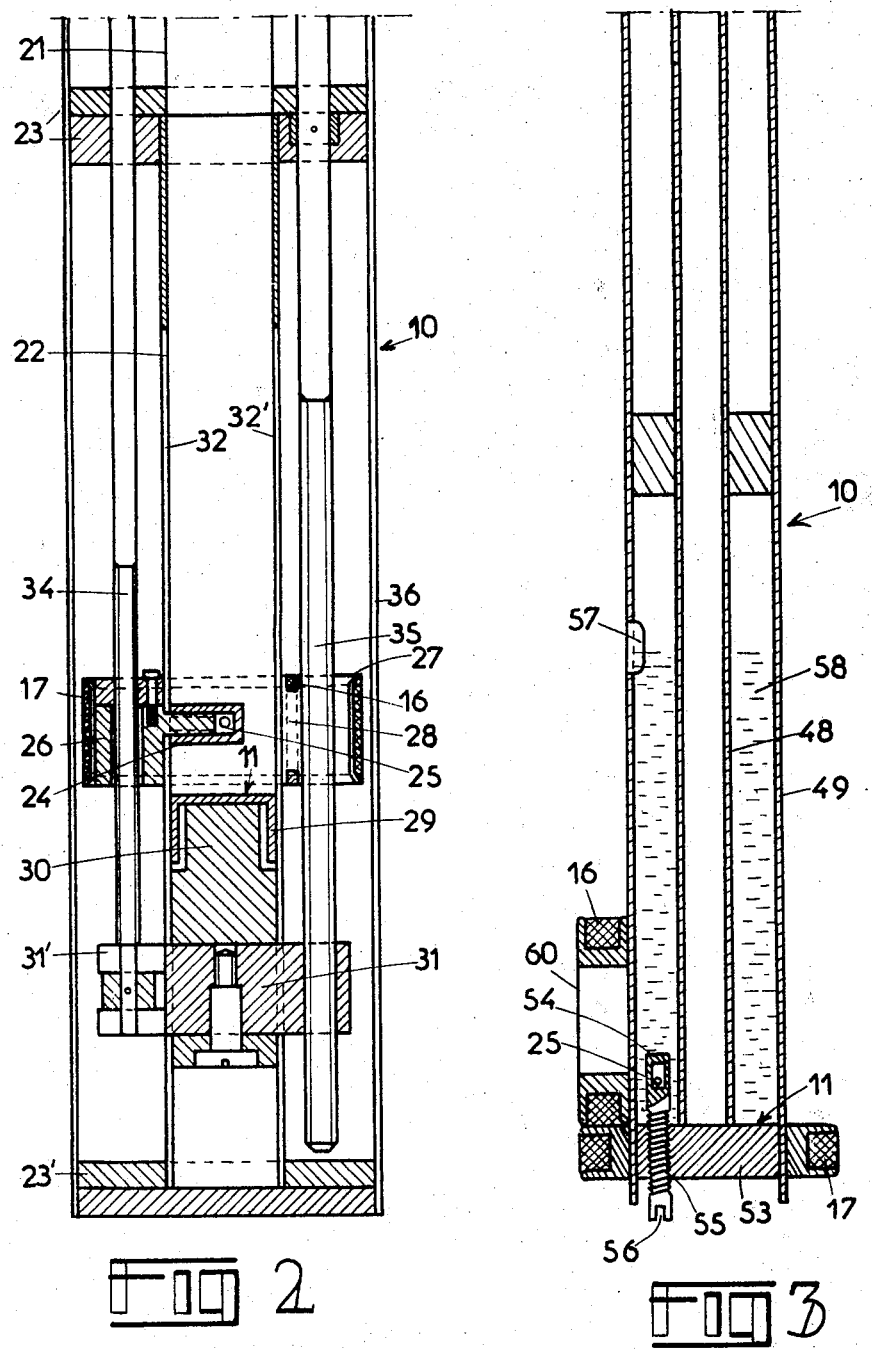

3,441,837
GYROMAGNETIC RESONANCE MAGNETOMETER
WITH FERRIMAGNETIC SAMPLE
Bernard P. L. Desormiere, Antony, Jean Claude Parouty, Fontenay-aux-Roses, and Andre L. Piechon, Paris, France, assignors to Compagnie Francaise Thomson-Houston, Paris, France, a corporation of France
Filed Mar. 5, 1965, Ser. No. 437,386
Claims priority, application France, Mar. 12, 1964, 967,125
Int. Cl. G01n 27/00; G01r 33/08
U.S. Cl. 324—.5                         14 Claims

ABSTRACT OF THE DISCLOSURE

Gyromagnetic resonance magnetometer for measuring steady magnetic fields of relative strong intensity at very low temperatures, wherein a ferrimagnetic body is supported within a probe member constituting a tubular transmission line. The ferrimagnetic sample is subjected to the action of the unknown magnetic field to be measured together with that of a high frequency magnetic field of a given direction. The absorption line of the ferrimagnetic sample is observed and the corresponding resonance frequency is measured accordingly which is related to the steady magnetic field.

---

This invention relates to instruments based on the gyromagnetic precession resonance principle, for the measurement of steady magnetic fields, particularly fields of relatively strong intensity.

A considerable number of magnetometer devices have been described and patented, wherein the measurement of an unknown, steady magnetic field is based on a measurement of the frequency of resonance between an artificially-generated radio-frequency oscillatory magnetic field at an angle to the steady field being measured, and the frequency of precession of atomic and/or sub-atomic dipoles (including atomic nuclei, protons, electrons and other spin particles or particle systems) contained in a sample of matter exposed to both fields.

A broad principle on which many such methods rely can be explained by the following oversimplified but generally correct statement. In the absence of the auxiliary field, the magnetic dipoles tend to align themselves with the steady field to be measured. When the oscillatory auxiliary field is applied, the dipoles are displaced from their initial angular position at each cycle of the auxiliary field, and then tend to return to that position as the auxiliary field drops to zero during its oscillatory cycle. This return movement is a movement of precession, and possesses an inherent precession frequency which, ceteris paribus, is a well defined function of the steady field to be measured, being generally proportional to the field intensity. If the frequency of the auxiliary field is made equal to (or a subharmonic of) the precession frequency, so that resonance occurs, a substantial part of the energy of the auxiliary field is absorbed and sustains a sharp attenuation. Noting the frequency at which this absorption occurs can provide an accurate measurement of the precession frequency and hence the intensity of the field to be measured.

Conventional magnetometers based on the gyromagnetic precession resonance principle broadly described above, possess various drawbacks which have rendered them unsuitable for many important applications.

Most usually, such magnetometers when designed for highly precise field measurements have been constructed and operate to work with hydrogen nuclei or protons, as the precessing dipoles, because of the very narrow bandwidth of the resulting resonance. However, because the magnetic moment per proton is extremely low, satisfactory measurement requires the simultaneous participation of an enormous number of protons or hydrogen nuclei. This means that the sample of proton-containing matter used in the magnetometer probe must be quite large (say of the order of one cubic centimeter and sometimes much more bulky depending on the field intensities and on the substance used such as water or a light hydrocarbon). The resulting probe is then incapable of performing fine measurements, such as the point-by-point exploration of a non-uniform magnetic field.

An especially serious limitation of conventional gyromagnetic resonance magnetometers is encountered in connection with the measurement of magnetic fields at very low temperatures, say 50° K. and below, a field receiving considerable attention at the present time. The coupling energy between the dipoles of a sample of matter decreases greatly at low temperatures, and with it the amplitude and sharpness of the resonance peak and hence the accuracy of the measurement.

Objects of the present invention include the provision of improved gyromagnetic resonance magnetometers possessing some or all of the following advantageous features:

The sample of matter used therein is extremely small, say of the order of 1 cubic millimeter, and the magnetometer probe can be made to correspondingly small sizes making possible the point-by-point exploration and mapping of non-uniform fields having appreciable gradients.

The magnetometer will yield accurate and sensitive measurements of magnetic fields over a broad range even at very low temperatures, close to absolute zero.

The sample of matter constituting the sensitive element of the magnetometer probe is in the form of a small spherule of a suitable ferrimagnetic material which is freely mounted so as to be self-orientable in the direction of the steady field to be measured, thereby enhancing the accuracy of the measurement.

During a measurement the sensitive spherule is subjected to vibration by a low-audio-frequency, low-amplitude auxiliary sweep field thereby facilitating the proper self-orientation of the spherule.

The magnetometer measures the unknown magnetic field both in intensity and direction.

The result of the measurement is displayed on the screen of a cathode ray tube oscilloscope to indicate both the intensity and the direction of the unknown field vector.

Means are provided for readily controlling the bandwidth of the absorption band, so as to produce, selectively, either a relatively wide absorption band facilitating initial adjustment, or an extremely narrow absorption line permitting high-precision measurement.

Means are provided for switching between two different sweep amplitudes for the audio-frequency sweep field, the broader sweep facilitating initial search and the narrower sweep permitting high precision in the final measurement.

An auxiliary sweep field of low frequency and low amplitude is used for the three-fold purpose of determining the direction of the unknown field, scanning the sweep coordinate for the oscilloscopic display, and vibrating the sensitive ferrimagnetic spherule in order to ensure its free orientability.

In the application to the field of very low temperatures, means are provided for improving the heat exchange relationship between the low-temperature external medium and the sensitive element (ferrimagnetic spherule) of the probe, as well as eliminating temperature elevations in and around the sensitive element which would cloud the measurement.

The above and other objects of the invention and the characteristic features thereof will appear as the disclosure proceeds with reference to specific exemplary embodiments illustrated in the accompanying drawings, wherein:

FIGURE 1 is a diagram illustrating the general set-up of a magnetometer system according to the invention;

FIGURE 2 is a view in longitudinal section of a magnetometer probe according to one embodiment;

FIGURE 3 is a similar view of a magnetometer probe according to another embodiment;

Figure 4:
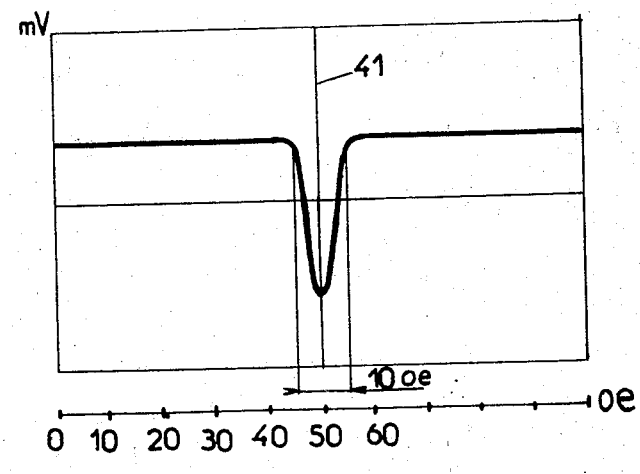
FIGURES 4 and 5 show oscillograms obtained during a measurement.

The magnetometer system shown generally in FIGURE 1 comprises a precessing generator 2 delivering a stable, adjustable radio or microwave frequency. The output of the precessing generator is delivered to one input leg 4 of a conventional Y-circulator 6. Another leg 8 of circulator 6 has connected to it one end of a magnetometer probe 10 according to the invention, two practical embodiments of which will be later described in detail.

For the present it is sufficient to indicate that the probe 10 comprises a length of transmission line (such as a coaxial line or a waveguide), provided with a reflective termination 11, and having means for mounting within it, somewhat short of the termination 11, a freely orientable spherule 25 of suitable ferrimagnetic material, preferably a substantially pure monocrystal of yttrium garnet. The reasons for choosing this particular substance and the precise manner in which it is mounted in the probe will be discussed later.

Also supported from the probe 10 near the spherule 25 are a pair of field coils 16 and 17 disposed at right angles to each other. The field coils 16, 17 are connected as shown by way of a reversing switch 18 with one output of an auxiliary sweep generator 20, delivering an output of relatively low amplitude and a low audio frequency $f1$, e.g. 50 c.p.s. In this specific example, sweep generator 20 has a primary winding 12 connected across a 50 c.p.s. alternating supply network 13 and two secondary windings 14 and 15. Secondary winding 14 is provided with an intermediate tap 19, and a switch arm 33 selectively movable between the tap and an end of winding 15 makes it possible to apply, to field coil 16 or field coil 17 as selected by means of reverser switch 18, either the full voltage output developed across the secondary winding 15, or only a portion of said voltage when switch arm 33 is engaging tap 19.

The other secondary winding 14 of sweep generator 20 is connected to the input of a variable phase-shifter 37 provided with the phase adjusting control 38. The output of phase shifter 37 is applied to the sweep or scanning control terminals 39, e.g. the horizontal deflection control terminals, of a cathode ray oscilloscope 40. The oscilloscope 40 has another control terminal 42, such as a vertical deflection control, which is connected to the output of a conventional detector rectifier circuit 44 the input of which is connected to the third leg 9 of the Y-circulator 6.

In operation, the probe 10 is positioned with its terminal end 11 in the steady magnetic field to be measured. This steady field $H_0$ is here shown as lying in the plane of the drawing and directed at an unknown angle to the direction of probe 10. Under the action of this steady $H_0$, the ferrimagnetic spherule 25 assumes a position in its free mounting such that a majority of the ferrimagnetic dipoles in it are oriented parallel to the field vector $H_0$.

Processing generator 2 is operated to generate an output frequency of suitable value in the selected RF or UHF range. This frequency is propagated down the transmission line constituting proble 10 and appears as an electromagnetic field of the said frequency in the end part of the probe around the ferrimagnetic element 25. It is assumed that probe 10 is so oriented that the magnetic vector of this precessing field is generally normal to the plane of the drawing in which the unknown field $H_0$ is contained. The precessing magnetic field in these conditions tends, during each cycle of the output of generator 2, to displace the magnetic dipoles of the ferrimagnetic substance from their equilibruim positions in alignment with the field $H_0$ vector, and then allow the dipoles to precess back to that position. In the course of this interaction between the precessing magnetic field and the magnetic dipoles, a certain amount of the electromagnetic energy in probe 10 is absorbed. If the output frequency of generator 2 equals a value resonant with the inherent gyromagnetic precession frequency of the magnetic dipoles in the ferrimagnetic material, the amount of energy thus absorbed reaches a sharp maximum. The resonant frequency is hereinafter called $f_R$.

The field created by generator 2, after propagating down the probe and interacting with the dipoles of spherule 25, is reflected from the short-circuited termination 11 of the probe and travels back up the probe into the circulator 6 through leg 8 and out from the circulator by way of leg 9. The energy issuing from circulator leg 9 is detected in rectifier 44 and applied to the vertical deflector plate terminal 42 of the cathode ray tube 40. Thus the vertical coordinate of the oscilloscopic display is a function of the amount of RF or UHF energy absorbed through interaction with the magnetic dipoles of the sensitive element 25.

The sweep generator 20 is operated to produce a low-amplitude, low-frequency output wave in the audio-frequency range. Sweep breadth control switch 33 may be engaged with the end terminal of secondary winding 15 to provide a broad sweep for initial coarse adjustment and search purposes, and later moved into engagement with tap 19 to reduce the breadth of sweep for fine adjustment, as later explained. The sweep wave from winding 15 is selectively applied, through reverser switch device 18, to one or the other of the two mutually orthogonal field coils 16, 17. Coil 16 when energized creates a low-frequency alternating sweep field $h_{A1}$ which is perpendicular both to the longitudinal axis of probe 10 and to the magnetic vector $h_R$ of the microwave precessing field (normal to the plane of the drawing). Field coil 17 when energized creates an alternating sweep field $h_{A2}$ parallel to the probe axis but again perpendicular to the microwave magnetic vector $h_R$. Thus, whichever one of the field coils 16, 17 is energized, there is created an auxiliary low frequency sweep field component $h_{A1}$ or $h_{A2}$ which is normal to the microwave precessing field $h_R$.

The low-frequency output from secondary winding 14 of sweep generator 20, applied by way of phase shifter 37 to the horizontal deflection terminals 39 of the cathode ray tube 40, produces a sweep of the cathode ray beam across the horizontal scanning coordinate of the screen at the low sweep frequency $f_A$.

The vertical deflection terminal 42 of the cathode ray tube is supplied with the rectified output energy issuing from circulator leg 9 and rectifier 44, which energy has interacted with the magnetic dipoles of sensitive element 25 as earlier explained.

The phase shifter 37 is adjusted by means of control 38 so that the maximum amplitude $H_{A1}$ or $H_{A2}$ of the auxiliary sweep field $h_{A1}$ or $h_{A2}$ will occur at the left and right ends of the oscilloscope screen.

In these conditions, the video signal applied to terminal 42 undergoes a sharp attenuation whenever the sweep field $h_{A1}$ or $h_{A2}$ passes through a value such that the geometric sum of said auxiliary field value plus the fixed, unknown, value of the field $H_0$ assumes a resultant value such that the corresponding gyromagnetic resonance frequency of the dipoles of the ferrimagnetic sphere 25 equals the RF or UHF frequency being delivered by main generator 2. A sharp resonance peak then appears on the screen of oscilloscope 40.

By reducing the sweep amplitude and by adjusting the tuning control 3 of the main generator, the said resonance peak may be brought into coincidence with the central index 41 on the screen. A preferred two-stage procedure for this operation will be described later. When the resonance peak has been brought into precise coincidence with central marker 41, it is evident that the output frequency being delivered by generator 2 equals the gyromagnetic resonant frequency $f_R$ corresponding to the amplitude of the field $H_O$ under investigation.

Two measurements are made, by selectively actuating the reverser switch 18 to energize first say the transverse field coil 16 and thus create a first sweep field component $h_{A1}$ in the transverse direction, and then energize the axial field coil 17 and thus create a second sweep field component $h_{A2}$ in the axial direction. For the two tests, the following equations respectively can be written:

$$f_{R1} = \gamma(H_o \vec{+} H_{A1}) + C$$

$$f_{R2} = \gamma(H_o \vec{+} H_A{}^2) + C \quad (1)$$

In these equations, $f_{R1}$ and $f_{R2}$ are the respective resonant frequency values to which the main generator 2 must be tuned in order to centre the responance peak on the screen; $\gamma$ is a gyromagnetic coefficient, substantially a constant characteristic of the ferrimagnetic material being used in element 25; $H_O$ is the field being measured as earlier noted; $H_{A1}$ and $H_{A2}$ are the modules of the maximum amplitudes of the components of the sweep fields created by energizing either of the field coils 16 and 17, and C is a constant.

From the measurement of $f_{R1}$ and $f_{R2}$, are deduced the projections onto $H_O$ of the components $H_{A1}$ and $H_{A2}$. If $\theta$ is the angle between the fields $H_O$ and $H_{A1}$, these projections have as values respectively:

$$p_1 = (H_{A1} \cos \theta)$$

$$p_2 = (H_{A2} \sin \theta)$$

The amplitude of the sweep field being known by measurement, for instance $H_{A1}$, the direction of $H_O$ is easily deduced by effecting $$p_1/(H_{A1}) = \cos \theta$$

FIGURE 2 illustrates one practical embodiment of a magnetometer probe 10 constructed in accordance with the invention. In this embodiment the probe comprises a length of waveguide 22 which may be made of any suitable non-magnetic material having good heat conductivity, such as brass. Guide 22 is shown connected through flanges 23 with an extension guide 21 which may be stainless steel, and which may in turn be connected with one leg of a Y-circulator in the manner explained with reference to FIGURE 1. A protective casing 36, made of a non-magnetic material having good heat conductivity, herein copper, surrounds the waveguide assembly in spaced relation with it, being suitably attached, e.g. brazed, to the periphery of flanges 23 and end flanges 23'. The terminal part of the guide 22 shown has a pair of longitudinal slots 32, 32' formed in opposite sidewalls of it.

Mounted externally of one sidewall of guide 22 some distance from its terminal end is a supporting block 26. Secured to this block, as with screws, is an insulating winding core 27 on which is wound the axial field coil 17 previously referred to, in generally coaxial relation with the guide and outwardly spaced from the outer surfaces of the guide walls. Secured to the outer surface of the sidewall remote from block 26, and inwardly of axial coil 17, is a winding core 28 which carries the transverse field coil 16, earlier referred to.

Projecting through slot 32 into waveguide 22 from block 26 is small housing 24 made of a suitable non-magnetic, electrically insulating material, for example poly-tetrafluoroethylene ("Teflon") or the like. Housing 24 has an inner end chamber in which is received the sensitive element 25 of ferrimagnetic material. This element constitutes, according to a preferred feature of the invention, a single crystal of ferrimagnetic garnet, and more specifically of a high-purity yttrium iron garnet. Further, element 25 is shaped into an accurately spherical ball having a highly polished surface condition. According to the invention, a satisfactory range of diameters for the ferrimagnetic spherule 25 is about from 0.5 to 1.5 millimeters, though other diameters above and below this range may be used if desired.

The spherule 25 is positioned within its chamber in housing 24 so as to be freely mobile therein and hence capable of self-orientation in any direction under the action of the magnetic fields to which it is exposed. Except for the ferrimagnetic spherule 25, the chamber in housing 24 is preferably free of any substance capable of interferring with the free mobility of the spherule, and/or susceptible of affecting the thermal conditions in the vicinity of the spherule, as by generating heat due to the dielectric effects of the precessing magnetic field.

Means are provided according to a feature of the invention for adjusting the axial distance between the ferrimagnetic element 25 and the reflective termination 11 of the waveguide 22. For this purpose said reflective termination is provided in the form of a bush-shaped shorting plunger 29 carried on the top of a piston member 30 slidable in guide 22. Piston 30 is shown secured with a screw to a crossmember 31 which projects through the slots 32, 32' and is connected at its outer ends with a collar 31' surrounding the guide. Means are provided for adjustably shifting collar 31' and with it piston 30 and shorting plunger 29 longitudinally of the guide, and include the two screw rods 34 and 35.

Screw rod 34 is supported for free displacement in flanges 23, has its screw thread engaging a threaded passage formed through upper supporting block 26, and has its end part rotatably but non-displaceable attached to collar 31'.

Screw rod 35 is journalled for rotation without axial displacement in the upper flange 23 and has its screw thread engaging a threaded passage formed through collar 31'.

With the dual screw rod adjusting means just described, it will be apparent that rotation of rod 34 will cause longitudinal displacement of block 26 and spherule 25 while the collar 31, piston 30 and shorting plunger 29 are left stationary with respect to the waveguide, thereby altering the distance from the shorting plunger to the spherule. On the other hand, rotation of screw rod 35 will cause a bodily displacement of both block 26 and collar 31' relatively to the waveguide with out altering the spacing between them nor hence the distance between the shorting plunger and spherule.

The provision for adjusting the distance between the sensitive element 25 and the shorting termination of the waveguide in a magnetometer probe according to the invention is advantageous in that it permits of adjusting as desired an over a wide range the width of the absorpton band occurring at gyromagnetic resonance in the measuring process. More specifically, the breadth of the absorption band and hence of the attenuation peak appearing on the screen of oscilloscope 40, can be shown to be inversely proportional to the degree of coupling of the ferrimagnetic element 25 considered as part of a resonant cavity. The coupling factor in turn can be shown to be proportional to the expression $$\cos^2 (2\pi d/\lambda g)$$

where $d$ is the distance from element 25 to the shorting termination 11 or plunger 29, $\lambda g$ is the wavelength in the guide of the microwave energy from generator 2. It is thus apparent that the coupling factor can be varied between 0 and 1 and hence the breadth of the absorption band can be easily and effectively controlled by varying the quantity $d$, and this is achieved in the magnetometer probe of FIGURE 2 by rotation of screw rod 34.

According therefore to preferred procedure for conducting a magnetometric process with the apparatus of the invention, the screw rod 34 may be initially adjusted to provide a suitable distance $d$, as determined by calculation or test, such that the gyromagnetic resonance coupling of the ferrimagnetic spherule is of moderate value, and thus provides an absorption band of appreciable width. Concurrently, sweep breadth control switch 33 may be moved to its broad-sweep position in engagement with the extremity of winding 15 so that the sweep field $h_A$ created by either field coil 16 or 17 has a relatively large amplitude. The resonance peak can thus be readily and quickly located on the screen of oscilloscope 40, and shifted across the screen to bring it into approximate coincidence with the central marker 41 as earlier described by adjustment of oscillator tuning control 3. Then, bandwidth control switch 33 may be displaced to engage tap 19 to reduce the sweep amplitude, and the adjusting rod 34 of probe 10 rotated in a suitable direction while observing the oscilloscope display, so as to whittle down the resonance peak to its greatest sharpness. There can in this way be obtained an absorption line of extreme fineness, of the order of only 1 or 2 oersted at temperature about 4° K., along the horizontal coordinate of the oscilloscope. Finally, this fine absorption line is brought into precise coincidence with the central marker 41 through fine adjustment of the generator tuning control 3 or by other means. Field measurements of extreme precision can thus be effected.

Adjustment of the screw rod 35 provides a means of measuring the field intensities and directions at a series of accurately determined, closely spaced points along the longitudinal direction of the probe 10 without displacing the probe itself and without varying the absorption bandwidth adjustment. This provision, when taken with the small dimension of the sensitive ferrimagnetic element 25, greatly facilitates and expedites the accurate mapping of a non-uniform magnetic field which may include steep field gradients, a process which was not feasible with conventional magnetometer probes.

The magnetometer probe described with reference to FIGURE 2 is thus seen to have great advantages over conventional magnetometer devices in many applications. Nevertheless it has its limitations. One obvious limitation is that since the frequency of the microwave field propagated by waveguide 22 must be proportional to the strength of the magnetic field being measured, the device is unsuitable for the measurement of relatively weak fields since the dimensions of the probe would be required to be excessively large. The waveguide type probe of FIGURE 2 is therefore well suited to the measurement of strong fields, say above about 3000 oersted, but becomes impractical for weaker fields. Also since the frequency range of microwave energy that will propagate through the guide is limited, said waveguide type probe cannot serve in cases where the magnetic field being investigated is susceptible to considerable variations in space and/or time, say greater than about ±20%.

For use with weaker magnetic fields, and/or fields liable to vary over wide ranges, the alternative form of probe shown in FIGURE 3 may advantageously be used. In this embodiment, the probe 10 comprises a length of coaxial line including a tubular central conductor 48 and outer conductor 49, both made, in this example, from non-magnetic stainless steel. As austenitic grade of steel containing about 13% nickel, 17.5% chromium and 2.5% molybdenum has been found satisfactory. The probe may be connected at its input end through any suitable means with a circulator as earlier described with reference to FIGURE 1. The receiving (lower) end of the probe 10 is sealed by means of a fixed shorting termination plate 53. A coil support 50 secured to a side of outer conductor 49 near the termination carries the transverse field coil 16, and a coil support secured around the outer conductor 49 at the terminal end thereof carries the axial field coil 17.

The sensitive element in the form of an optically polished spherule 25, e.g. of pure yttrium iron garnet, is contained in a freely movable manner within a recess 54 formed in the upper end of a cylindrical screw stud 55 made from suitable material such as an epoxy resin, and formed with an outer screw thread adjustably screwable in a threaded aperture formed through the shorting termination plate 53 in the annular space between the inner and outer conductors 48 and 49. Any suitable means may be provided for rotating the screw stud housing 55 in order to vary the distance between the ferrimagnetic spherule 25 and the reflective termination 11 provided by the terminal shorting plate 53, for the purposes earlier indicated. While as here shown the adjusting operation may be simply performed with a screw driver inserted into a kerf 56 in the outer end of screw housing 55, it will be realized that various other convenient adjusting means may be provided.

The coaxial type probe of FIGURE 3 has been found suitable for measuring magnetic fields over a very wide range, varying in a ratio of 15 to 1 or more.

A hole 57 is shown formed through the sidewall of outer conductor 48 some distance above the receiving end of the probe and serves to fill the space surrounding housing 54 of ferrimagnetic element 25 with cooling liquid 58, e.g. liquid helium, in order to establish close heat exchange relation between said element and the external low-temperature medium in which the magnetic field is to be measured. The spherule 25 is thus placed in intimate thermal exchange relation with the cooling fluid, so that thermal equilibrium with the external medium is established practically instantaneously. Further, since the chamber 54 in which the ferrimagnetic spherule 25 is movable is free from any substances liable to generate heat dielectrically by the action of the high frequency field, a source of error especially troublesome in low-temperature investigations is eliminated. The practically complete elimination of dielectric heating as a source of error in a probe according to the invention makes it possible to use substantially higher levels of the microwave energy as supplied from generator 2 than would otherwise be possible, and thus considerably increase the video signal level without requiring amplification. The net result is a heightened signal-to-noise ratio and a correspondingly increased over-all sensitivity.

As will be understood from the foregoing description, an important feature of the invention resides in the use of the audio-frequency magnetic sweep field produced by sweep generator 20 and field coils 16 and 17. According to this invention, this sweep field can be looked at as performing three functions. It provides the scanning coordinate for the oscilloscope display. It provides the two mutually orthogonal field components (called $h_{A1}$ and $h_{A2}$) that are necessary for determining the direction of the field being measured. And finally, it provides the low-amplitude, low-audio-frequency mechanical vibrations which ensure that the sensitive ferrimagnetic sphere 25 will effectively assume a true, reproducible, orientation under the action of the measured field.

It has been found that in order to ensure best performance of all three functions, the sweep frequency used should preferably lie within a very low-pitch audio-frequency band, say a range of about from 20 to 200 c.p.s., although frequencies lying somewhat outside this range may sometimes be used. A preferred sweep frequency value is 50 or 60 c.p.s. The indicated frequency ranges are advantageous because they are low enough to permit a substantially complete dissipation of the gyromagnetic precession energy within a single sweep cycle, throughout the temperature range in which the instruments are used.

At the same time, the indicated low-pitch audio sweep frequencies are such that they are able successfully to impart bodily mechanical vibrations to the ferrimagnetic spherule. Such bodily vibrations are of very low amplitude and do not result in any appreciable increase in the width of the absorption line. At the same time said vibrations are effective in increasing the mobility of the spherule in its mounting recess, to such an extent that the spherule is able at each measurement to position itself freely and reliably to the particular orientation in space, where its ferrimagnetic dipoles will be predominantly aligned with the vector of the steady magnetic field being investigated.

Also, said low-pitch audio sweep frequencies are of course of a suitable range to provide a desirable scan cycle for the oscilloscope.

Figure 5:
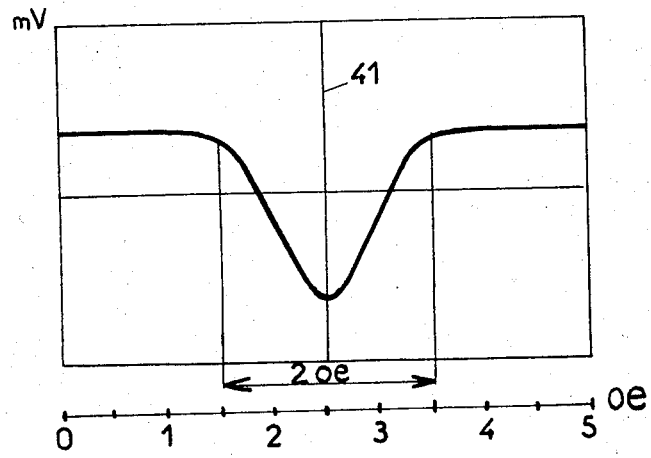

As regards the amplitude $H_A$ of the sweep field $h_A$, as determined by the output voltage of the sweep generator and the ampere-turns of the field coils 16 and 17, this amplitude should be kept low enough again to avoid any appreciable increase in the absorption bandwidth while being sufficiently great to fulfill the sweep function. A generally satisfactory range for the amplitude of the sweep field is about from 5 to 200 oersted. In this respect the sweep breadth selector switch 33 constitutes a particularly valuable feature of the instrument described, especially when taken jointly with the bandwidth control provision involving the adjustment of the distance from the ferrimagnetic element to the shorting termination of the probe, as described above. The tap 19 on the sweep generator output winding 15 may be so positioned that the output voltage delivered when switch 33 is engaging said tap is e.g. about one twentieth, the full output voltage of said winding. Thus, in a practical embodiment of the invention, the sweep field amplitude obtained when using the full output from generator winding 15 was 100 oersted, and the reduced sweep amplitude obtained with switch 33 engaging tap 19 was 5 oersted. Preliminary adjustment of the distance from the sensitive element 25 to the shorting termination 11, as obtained by action on screw rod 34 (FIGURE 2) or screw stud 55 (FIGURE 3), was effected to provide an initial absorption bandwidth of the order of 10 oersted. With this initial set of adjusted values, the oscilloscopic display on the screen of cathode ray tube 40 was substantially as shown in FIGURE 4, where the 10 oersted-wide absorption band or resonance peak is shown approximately centred across the 100 oersted broad horizontal scanning coordinate, approximately in coincidence with the central marker 41. Thereafter the switch 33 was thrown into engagement with tap 19, so that the total breadth of the sweep as indicated by the horizontal scanning coordinate was reduced to 5 oersted, as shown in FIGURE 5, and the screw rod 34 (FIGURE 2) or 55 (FIGURE 3) was slowly turned to narrow down the resonance peak to a width less than 2 oersted, as also shown in FIGURE 5, whereupon it could be accurately recentered into coincidence with centre marker 41 by a fine tuning of the frequency of main generator 2.

As concerns the nature of the material used in the sensitive element according to a preferred aspect of the invention, this as already indicated is a high-purity single crystal of yttrium iron garnet. Such a substance is characterized by a very high coupling of its electronic magnetic dipoles and a correspondingly high interaction energy with an RF or UHF field. This has a twofold advantage. it permits a great reduction in the volume of the sensitive element used, with the consequent possibility of accurate mapping of non-uniform fields, and it makes possible efficient measurement even at the lowest possible temperatures, such as in liquid helium, at which other types of matter, embodying less tightly coupled nuclear or electronic spin systems and consequently lower interaction energies would be incapable of providing signals of measurable intensity and resonance bands of acceptably narrow width.

However, the use of such a ferrimagnetic substance as the sensitive element in a magnetometer probe poses a serious problem. Owing to the inherent nature of the substance, the ferrimagnetic dipoles therein possess a fixed orientation throughout the magnetic domain of the crystal, and hence the gyromagnetic precession frequency depends on the orientation of the crystal sample with respect to the field being investigated. But the orientation of the field itself is, of course, in the general case, unknown. Hence, a probe thus constructed would not be generally usable in a field of unknown orientation otherwise than by resorting to relatively complicated and tedious procedures such as searching for the particular orientation of the probe which results in a maximum for the resonant frequency at each measurement.

This serious difficulty has been eliminated in the present invention through specific provisions for rendering the spherule of ferrimagnetic material freely orientable, and self-alignable with the unknown direction of the field, regardless of the particular orientation of the probe. To achieve such freedom of orientation it is not sufficient merely to support the spherule without attachment within a chamber larger than it, as might be expected. Experience shows that in such circumstances the self-alignment of the spherule is effected sluggishly or not at all, even with very small and lightweight spherules. However, when the spherule is subjected to bodily mechanical vibrations in a suitable audio frequency range, even if the amplitude of these vibrations is quite small, it is found that the mobility of the spherule is increased sufficiently to ensure reliable self-alignment of the spherule in the field being measured. These audio-frequency vibrations are imparted to the spherule according to the invention by the audio-frequency sweep field as earlier described.

The use of an accurately spherical and highly polished ball of ferrimagnetic material as the sensitive element is advantageous, aside from the fact that it can be made self-orienting by the provisions just described, for the further important reason that the constancy of the linear relationship between the measured field and the gyromagnetic resonance frequency as a function of temperature is improved. In the case of a true sphere, the relationship between resonant frequency and field assumes the form $$f_R = H_0 + C$$

owing to the absence of a demagnetizing field term. It is from this formula that the Equations 1 earlier given herein were derived. The coefficient $\gamma$ varies only slightly with temperature and can be regarded as a constant. Thus, with yttrium iron garnet as the ferrimagnetic material, $\gamma$ equal 2.72 mc.p.s. per oersted at ambient temperature (288° K.), and 2.80 mc.p.s./oersted at the temperature of 45° K.

It is thus seen that the invention derives a dual advantage from the spherical shape imparted to the sensitive element in the improved magnetometer probes: the full benefit from this shape is only obtained due to the free orientability of the sphere.

It is to be understood that a great many changes may be made in the details of the apparatus disclosed above without departing from the spirit of the invention. Thus, in cases where only the strength, not the direction of an unknown field is to be measured, a single sweep field coil may be used instead of the two shown. On the other hand, three sweep field coils may be provided in those cases where the field direction is to be ascertained in three dimensions. Where more than one sweep field coils are used, as herein disclosed, the switching means between the coils, shown in FIGURE 1 as the reversing switch 18, may have means associated therewith for automatically reversing the position thereof at suitably timed intervals to provide apparently simultaneous displays on the oscilloscope screen. The precise frequency tuning and reading for the resonant frequency of the precessing generator may be effected by means of a conventional frequency counter instead of or in addition to the simple tuning control shown in FIGURE 1. A feedback link may in some cases be provided for automatically tuning the precessing generator to the resonant frequency. In order further to enhance the free orientability of the ferrimagnetic spherule, the latter may be floatingly mounted in a small body of fluid, preferably a gas having a low dielectric constant, sealed in a spherical pressure chamber. Various other modifications are of course conceivable in the light of the disclosure.

What we claim is:
1. Magnetometer apparatus comprising:
a spherule of ferrimagnetic material;

means supporting the spherule in a steady magnetic field to be measured and permitting free self-orienting rotation of the spherule about its centre for alignment of ferrimagnetic dipoles therein with the direction of said steady field;

sweep means creating an audio-frequency alternating magnetic sweep field in at least one direction adjacent said body at a low frequency within the low-pitch audio band;

precessing means creating a radio-frequency alternating magnetic precessing field adjacent said body, at a high frequency capable of resonant interaction with the gyromagnetic precession of ferrimagnetic dipoles in said body said fields being at an angle to each other;

means for receiving the energy from said precessing field after interaction with said dipoles;

display means including a scanning connection and an indicating connection;

means connecting said scanning connection with said sweep means to provide a sweep cycle for a scanning coordinate of the display;

means connecting said indicating connection with said energy-receiving means for varying an indicating coordinate of the display in accordance with the received, interacted energy; and means for adjusting the frequency of said precessing means into resonance with said gyromagnetic precession as determined by a resonant peak in said indicating coordinate of the display.

2. The apparatus claimed in claim 1, wherein said sweep field frequency is approximately in the band of from 20 to 200 c.p.s.

3. The apparatus claimed in claim 2, wherein said spherule comprises a single crystal of high-purity yttrium iron garnet and is provided with a high surface polish.

4. The apparatus claimed in claim 1 wherein said precessing means includes a probe member constituting a length of tubular transmission line having an input-output end and connectable to a source of radio-frequency energy and a reflective termination at its other end;

said spherule supporting means supports the spherule within said member at a determinable distance from said termination, and said sweep means includes at least one field coil supported on said probe member adjacent said spherule and connectable to a source of low audio-frequency energy so as to produce a sweep field having its magnetic vector at an angle to the magnetic vector of said radio-frequency energy.

5. Apparatus as claimed in claim 4, wherein there are two field coils mounted for producing fields at right angles to each other.

6. Apparatus as claimed in claim 4, including means for adjustably varying the distance from said spherule to said reflective termination.

7. Apparatus as claimed in claim 4, wherein said probe member constitutes a waveguide.

8. Apparatus as claimed in claim 4, wherein said probe member constitutes a coaxial line.

9. Apparatus as claimed in claim 4, wherein said reflective termination constitutes a shorting plunger and including screw means for displacing said plunger axially of the probe member for adjustably varying the distance from said spherule to said termination.

10. Apparatus as claimed in claim 4, wherein said reflective termination constitutes a shorting plunger axially displaceable in said member, said spherule-supporting means is axially displaceable along said member, and including first screw means for differentially displacing said plunger and spherule supporting means axially of the probe member for adjustably varying the distance from said spherule to said reflective termination and second screw means for bodily displacing said plunger and supporting means axially of the probe member for altering the point of measurement of said steady field.

11. Apparatus as claimed in claim 4, wherein said spherule supporting means comprises a recessed housing having a screw threaded shank portion extending therefrom, and a threaded hole is formed through said reflective termination of the probe member and said shank is screwably engaged in said threaded hole to support said recessed housing and said spherule therein interiorly of nthe probe member at a adjustable distance from said termination.

12. A low-temperature magnetometer probe assembly comprising:

a probe member constituting a length of tubular transmission line having an energy input-output end connectable to a source of radio-frequency energy and a reflective termination at its other end;

a spherule of ferrimagnetic material;

means supporting the spherule within the probe member at a determinable distance from said termination, including a recessed housing in which the spherule is placed for free self-orienting rotation about its centre for alignment of ferrimagnetic dipoles therein with the direction of a steady field to be measured;

at least one field coil supported on said probe member adjacent said spherule and connectable to a source of low audio-frequency energy and aperture means in said member at a greater distance from said termination than is the distance from said recessed housing, to permit entry of a low-temperature fluid medium into said member into immediate surrounding contact with said housing.

13. Magnetometer apparatus comprising:

a probe member constituting a length of tubular transmission line having an energy input-output end and a reflective termination at its other end;

a spherule of ferrimagnetic material;

means supporting the spherule within the probe member at a determinable distance from said termination and permitting free self-orienting rotation of the spherule about its centre for alignment of ferrimagnetic dipoles therein with the direction of a steady field to be measured;

at least one field coil supported on said probe member;

sweep generator means having a low audio frequency output connected with said field coil to create a magnetic sweep field adjacent said spherule;

a precessing generator having a radio-frequency output;

a circulator having an input leg connected to receive said precessing generator output;

means connecting said input-output end of the probe to another leg of the circulator to propagate radio-frequency energy from said precessing generator down the probe for gyromagnetic interaction with said dipoles and for reflection from said termination and reentry into the circulator through said other leg thereof;

display means including a scanning connection and an indicating connection;

means connecting said scanning connection with an output of said sweep generator to provide a sweep cycle for a scanning coordinate of the display at said audio-frequency; and means connecting said indicating connection with an output leg of said circulator for varying an indicating coordinate of the display in accordance with the interacted radio-frequency precessing energy reflected from said probe termination;

whereby the indicating coordinate of the display will exhibit a peak at resonance between said precessing energy and said dipoles.

14. The apparatus claimed in claim 13, including means for adjusting the distance from said spherule to said termination to alter the width of said resonance peak, and means for switching the amplitude of said first sweep generator output between two values to alter the breadth of sweep of said magnetic sweep field.

References Cited

UNITED STATES PATENTS

| | | | |
|---|---|---|---|
| 3,158,802 | 11/1964 | Jung | 324—0.5 |
| 3,081,428 | 3/1963 | Fowler | 324—0.5 |
| 3,087,122 | 4/1963 | Rowen | 324—0.5 |
| 3,191,118 | 6/1965 | Jung | 324—0.5 |
| 2,810,882 | 10/1957 | Walker | 324—58.5 |

OTHER REFERENCES

"Cryostat for Ferrimagnetic Resonance Experiments," Review of Scientific Instruments, vol. 30, No. 7, July 1959 (Dillon et al.).

"Spin Lattice Relaxation Time in Yttrium Iron Garnet," Journal of Applied Physics, vol. 29, No. 3, March 1958 (Farrar).

RUDOLPH V. ROLINEC, *Primary Examiner.*

MICHAEL J. LYNCH, *Assistant Examiner.*